No. 630,753. Patented Aug. 8, 1899.
W. H. SMITH.
STORAGE BATTERY.
(Application filed May 26, 1899.)
(No Model.) 2 Sheets—Sheet 1.
Fig. 1.
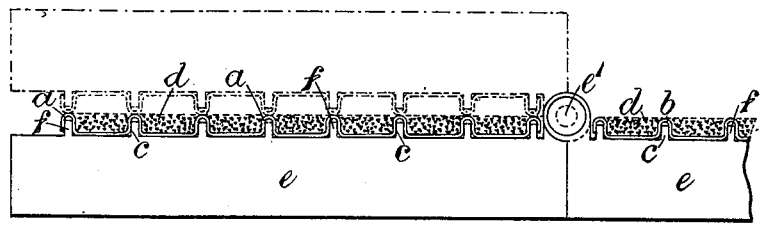
Fig. 3. Fig. 2.
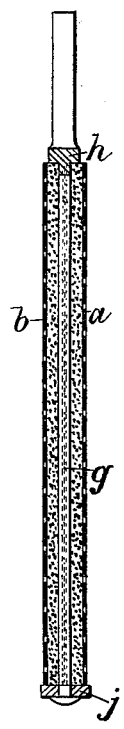 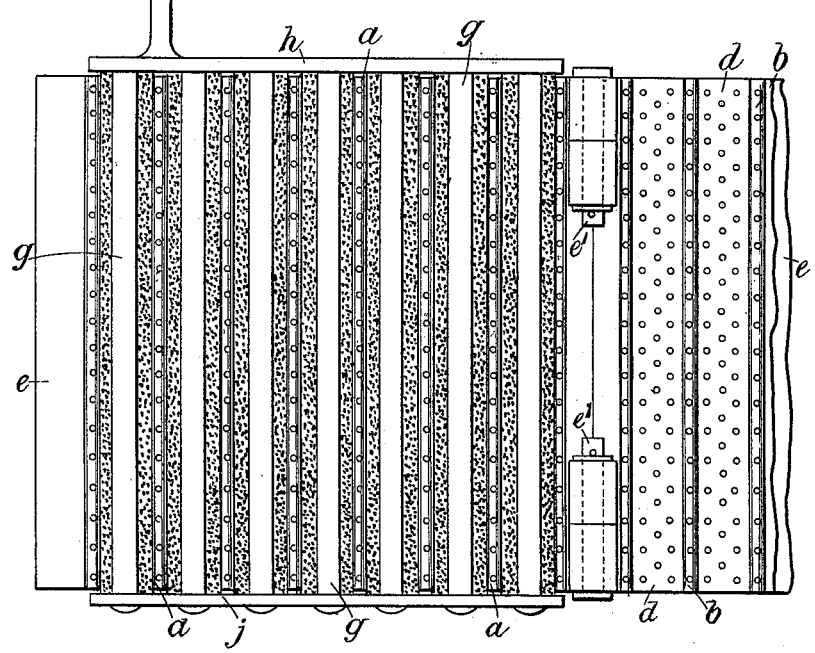
Witnesses Inventor
William H. Smith
By James L. Norris
atty
THE NORRIS PETERS CO., PHOTO-LITHO., WASHINGTON, D. C.

No. 630,753. Patented Aug. 8, 1899.
W. H. SMITH.
STORAGE BATTERY.
(Application filed May 26, 1899.)

(No Model.) 2 Sheets—Sheet 2.

Witnesses
H. B. Keefe
Geo. L. Sullivan

Inventor
William H. Smith
by James L. Norris
Atty

THE NORRIS PETERS CO., PHOTO-LITHO., WASHINGTON, D. C.

UNITED STATES PATENT OFFICE.

WILLIAM HENRY SMITH, OF LONDON, ENGLAND.

STORAGE BATTERY.

SPECIFICATION forming part of Letters Patent No. 630,753, dated August 8, 1899.

Application filed May 26, 1899. Serial No. 718,353. (No model.)

*To all whom it may concern:*

Be it known that I, WILLIAM HENRY SMITH, engineer, a subject of the Queen of Great Britain, residing at Upton Villa, Penge, London, England, have invented certain new and useful Improvements in Electric Accumulators or Storage Batteries and in Plates or Electrodes Therefor, of which the following is a specification, reference being had to the accompanying drawings, in which—

Figure 8:
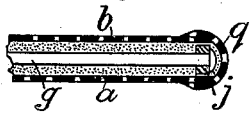
Figure 7:
Figure 5:
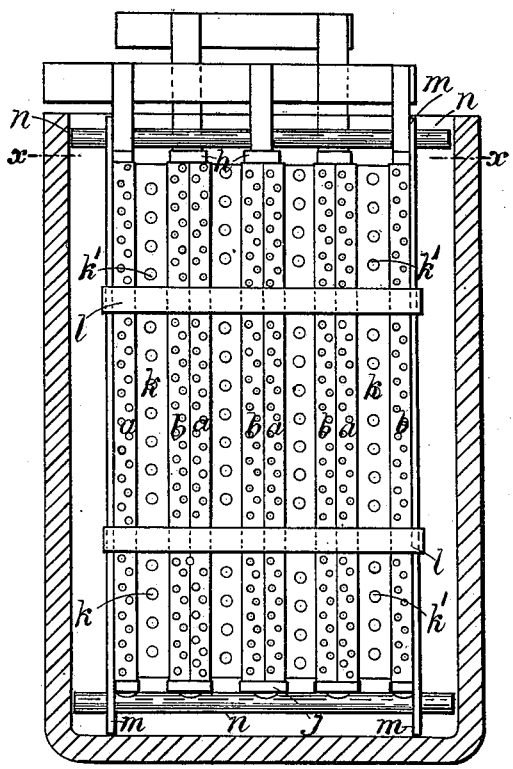
Figure 6:
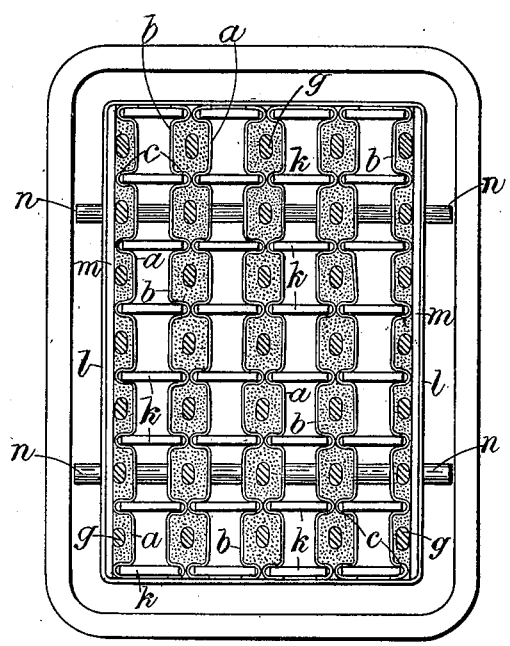
Figure 4:

Figure 1 is an end elevation, and Fig. 2 a plan, illustrating different steps or stages in the manufacture of my improved plates or electrodes. Fig. 3 is a vertical transverse section of one of my improved plates or electrodes. Fig. 4 is a horizontal section through the same. Fig. 5 is a side elevation of an electric accumulator made with my improved plates or electrodes, the containing box or cell being shown in section. Fig. 6 is a plan, partly in horizontal section, on the line x x, Fig. 5. Fig. 7 is a horizontal section illustrating a detail of construction, and Fig. 8 is a vertical transverse section illustrating another detail of construction.

My invention relates to electric accumulators or storage batteries in which the plates or electrodes are made with the active material inclosed in perforated retaining-envelops.

My said invention is chiefly designed to provide an accumulator plate or electrode which, while possessing the important qualities of lightness in proportion to capacity, freedom from buckling or distortion, strength, and capability of withstanding rough usage without injury, can be manufactured easily and at a low cost and with but little or no skilled labor.

One feature of my present invention is an accumulator plate or electrode with a retaining-envelop consisting of two channeled or corrugated perforated sheets or plates which are each made with wide grooves or channels on their inner side and narrow grooves or channels on their outer side and are placed face to face with active material between them in the said wide channels, a series of rods or cores of conducting material—such, for instance, as lead—being so arranged between the said sheets or plates that each rod extends along the tubular space formed by two opposite wide grooves or channels in the said perforated retaining sheets or plates and is surrounded by the active material therein. The said retaining sheets or plates are preferably made of non-conducting material—such, for instance, as celluloid or ebonite.

In making an accumulator plate or electrode according to my said invention I find it advantageous to proceed as follows, viz: I first make two channeled or corrugated sheets of perforated celluloid or other suitable material with narrow grooves or channels on one side and with wide grooves or channels on the other side thereof, and I place each of these sheets with its wide grooves uppermost on a flat or plane surface provided with a series of projecting strips, which enter the narrow grooves in the under side of the sheet. I then fill the wide grooves of each of the celluloid or other corrugated sheets or molds with active material—such, for example, as oxid of lead. I then, while the active material is still in a plastic condition, place a series of rods or cores of lead or other suitable conducting material on the active material contained in one of the said corrugated sheets or molds and lay the other corrugated sheet or mold on the top, so that its active material is in contact with the said rods or cores and so that its grooves or channels are directly above and parallel to those of the lower sheet or mold. I then press together the two sheets or molds until the active material in the same is in contact, at the same time forcing the conducting rods or cores into close contact with the active material.

To securely hold the two halves of the several retaining-envelops in the accumulator in their proper relative position, and thus obviate the liability to bulging thereof and consequent release of the active material from the space between them and at the same to compensate for expansion and contraction of the active material, I provide perforated separating-strips of insulating material which are fitted in the narrow external channels in the said envelops, and I pass elastic bands around the series of electrodes and around bars or plates which are placed one at each end of the said series and through which are passed suitable supporting-rods, some extending beneath and others above the said electrodes.

My said invention, moreover, comprises other improvements hereinafter set forth.

Referring to the accompanying drawings, a b are the two channeled or corrugated sheets of perforated celluloid, ebonite, or other suitable material, which are made with narrow grooves or channels c on the outer side and with wide grooves or channels d on the inner side thereof and which form the two halves of a retaining-envelop for inclosing the active material.

e e are the temporary supports for the two corrugated sheets or molds a b, which supports are provided with a series of projecting strips f, and are preferably connected by hinge-joints, as at e', Figs. 1 and 2, so that one can be folded over upon the other, as indicated by the dotted lines in Fig. 1, or other suitable means are provided for facilitating the placing of one sheet or mold in its correct position upon the other. One of the said sheets a b is placed on the flat or plane surface of each of the supports e, so that the projecting strips f thereof enter the narrow grooves c of the said sheet. These projecting strips serve to keep the grooves c free from active material and at the same time prevent flattening out of the corrugated sheet while being filled. The wide grooves or channels d of the sheets or molds a b are then filled with oxid of lead or other suitable active material until the same is level with the top of the said channels, as shown in Fig. 1. Then while the active material is still in a plastic condition the rods or cores g, of lead or other suitable conducting material, are laid on the active material in one half of the retaining-envelop, so that these rods are parallel with and in the center or about the center of the wide channels d of the said sheet, as shown in Fig. 2. The other half of the retaining-envelop is then placed on the top, so that its active material is in contact with the said rods or cores and so that the grooves or channels are directly opposite each other, as shown by dotted lines in Fig. 1. The two halves of the plate or electrode thus formed are then pressed together until the active material therein is in contact, the conducting-rods or cores being at the same time forced into the active material, so that they are embedded therein, as shown in Figs. 3 and 4. The electrode is then removed from the temporary supports e.

The two halves of each perforated retaining-envelop are sometimes secured together at their edges—for example, by folded pieces p of celluloid, ebonite, or the like slid over the said edges, as indicated in Fig. 7.

The electrodes are preferably so constructed that their grooves or corrugations extend vertically, as shown. The conducting rods or cores g are formed on or attached to a conducting-bar h, extending along the top of the electrode, and a bottom plate or bar j, of ebonite, lead, or other suitable material, is secured to the lower ends of the said rods or cores g, so as to prevent falling of the active material from between the aforesaid corrugated sheets or molds.

In some instances, in order to still further lighten the plates or electrodes, the bottom bar j is made thinner than is shown in Fig. 3, and a folded piece q, Fig. 8, of celluloid or other suitable material, is cemented or otherwise secured upon the lower edge of the plate or electrode. I find it advantageous also to secure the inner ridges of the corrugations of one half of the retaining-envelop to those of the other by means of cement or other suitable material or by partially dissolving the celluloid at these parts and causing them to adhere together.

In the accumulator shown in Figs. 5 and 6 the electrodes are kept in position at a suitable distance apart by perforated strips k, of ebonite or other suitable non-conducting material, which fit into the narrow external grooves c of the corrugated sheets a b and serve as struts to effectually prevent bulging of the retaining-envelops, even when the latter are made of very thin and light perforated sheets of celluloid. The several electrodes are held together, with the separating-strips k between them, by means of elastic bands l, placed around the series of electrodes. I find it advantageous to provide at each end of the series of electrodes retaining bars or plates m and to pass through these bars or plates suitable rods n, some of which extend beneath and others above the said electrodes. The said bars or plates m at one or both ends of the series are left free to slide upon the said rods n, so as to permit expansion and contraction of the active material. The said separating-strips, in conjunction with the said elastic bands and the end plates m and rods n, serve to retain the two halves a b of the several electrodes in their proper relative position and also to keep the active material in close contact with the conducting rods or cores, while permitting and compensating for the expansion and contraction of the said active material without distortion of the electrodes.

I prefer to make the electrode at either end of the series of a single perforated sheet or mold a or b, filled with active material, in which conducting-rods g are embedded, as shown in Figs. 5 and 6, the outer surface of each sheet being preferably covered by perforated plates of celluloid, ebonite, or other suitable material.

It is evident that the thickness of the plate or electrode bounded by the two channeled or corrugated perforated sheets can be varied at will by increasing or diminishing the depth of the channels or corrugations. Moreover, instead of combining two separate corrugated sheets I can, if desired, take a single corrugated sheet and after filling the wider channels thereof with the active material place the conducting-rods upon the active material in one half of the said sheet and then fold the said sheet upon itself, so that the wider grooves in one half thereof will be directly above and parallel with those in the other half thereof.

I sometimes make an accumulator with plates or electrodes each consisting of one channeled or corrugated perforated retaining-sheet, having its wider grooves filled with active material, and of a flat perforated retaining-sheet placed against the said corrugated sheet, the conducting-rods being embedded in the active material in the said grooves.

I am aware that accumulator plates or electrodes have been already devised in which the active material is inclosed between two perforated conducting-shells of lead, the electrodes being separated in the accumulator by porous non-conducting plates. I am also aware that accumulator plates or electrodes have been devised wherein the active material after being molded to the required shape around one or more conducting-rods and then dried is inclosed in a porous or perforated corrugated retaining-envelop; but these perforated retaining-envelops are not, like mine, made in two halves or parts provided with wide internal channels to receive the active material and with narrow external channels to receive perforated separating-strips, which will act as struts between adjacent electrodes to prevent bulging thereof, while leaving ample space between the electrodes for the circulation of the electrolyte, and which, in conjunction with elastic bands surrounding the series of electrodes and rods extending through the same, will securely hold the said halves in their proper relative position, while compensating for expansion and contraction of the active material.

What I claim is—

1. The combination, in an electric accumulator or storage battery, of plates or electrodes each comprising corrugated perforated retaining-envelops of non-conducting material having wide internal channels and narrow external channels, active material in the opposing wide channels thereof, conducting-rods embedded in said active material, separating strips or struts between said electrodes fitted into said narrow channels thereof, and means to yieldingly hold said electrodes together, substantially as, and for the purposes, above specified.

2. The combination, in an electric accumulator or storage battery, of plates or electrodes each comprising corrugated perforated retaining-envelops of non-conducting material having wide internal channels and narrow external channels, active material in the opposing wide channels thereof, conducting-rods embedded in said active material, perforated separating strips or struts between said electrodes fitted in said narrow channels thereof, end plates located one at each end of the series of electrodes, supporting-rods passed through said end plates and elastic bands placed around said series of electrodes, substantially as, and for the purposes, above specified.

3. In an electric accumulator or storage battery, a plate or electrode comprising a corrugated perforated retaining-envelop made in two halves or parts of non-conducting material each having wide internal channels for containing the active material and narrow external channels to receive separating strips or struts, which halves or parts are placed together face to face, active material inclosed in the opposing internal channels of said halves or parts, and conducting-rods embedded in said active material, substantially as, and for the purposes, hereinbefore described.

4. In an electric accumulator or storage battery, the combination of a retaining-envelop comprising a corrugated perforated sheet of non-conducting material having wide internal channels and narrow external channels, active material in said wide channels, conducting-rods embedded in said active material, and means to retain said active material and conducting-rods in said wide channels, substantially as, and for the purposes, above specified.

In testimony whereof I have hereunto set my hand in the presence of two subscribing witnesses.

WILLIAM HENRY SMITH.

Witnesses:
DAVID YOUNG,
ALEXANDER W. ALLEN.